(12) United States Patent
Glasmacher et al.

(10) Patent No.: US 6,636,807 B1
(45) Date of Patent: *Oct. 21, 2003

(54) METHOD OF STEERING A MACHINE ON A PREDETERMINED ROUTE AND DEVICE FOR ITS EXECUTION

(75) Inventors: Hans Glasmacher, Freising (DE); Gunther Bittner, Siegertsbrunn (DE)

(73) Assignee: Base Ten, Systems Electronics GmbH, Hallbergmoos (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/649,720

(22) Filed: Aug. 28, 2000

(30) Foreign Application Priority Data

Apr. 17, 2000  (DE) .......................... 100 19 011

(51) Int. Cl.⁷ ............................... G01C 21/26
(52) U.S. Cl. .................. 701/213; 701/209; 701/41; 340/995
(58) Field of Search ................. 701/213, 214, 701/216, 217, 201, 209, 41; 340/988, 990, 995; 180/168, 408, 422; 342/357.17

(56) References Cited

U.S. PATENT DOCUMENTS

| | | | | |
|---|---|---|---|---|
| 5,119,301 A | * | 6/1992 | Shimizu et al. ............. | 701/217 |
| 5,550,538 A | * | 8/1996 | Fujii et al. .................. | 340/995 |
| 5,659,476 A | * | 8/1997 | LeFebvre et al. ........... | 701/201 |
| 5,684,476 A | * | 11/1997 | Anderson .................... | 111/130 |
| 5,757,289 A | * | 5/1998 | Nimura et al. .............. | 340/995 |
| 5,781,870 A | * | 7/1998 | Okawa ........................ | 180/408 |
| 5,911,775 A | * | 6/1999 | Tanimoto .................... | 701/210 |
| 5,925,080 A | * | 7/1999 | Shimbara et al. ........... | 180/168 |
| 5,928,299 A | * | 7/1999 | Sekine et al. ................. | 701/41 |
| 5,991,688 A | * | 11/1999 | Fukushima et al. ......... | 701/209 |
| 6,023,653 A | * | 2/2000 | Ichimura et al. ............. | 701/208 |
| 6,047,227 A | * | 4/2000 | Henderson et al. .......... | 172/4.5 |
| 6,052,647 A | * | 4/2000 | Parkinson et al. ..... | 342/357.06 |
| 6,236,916 B1 | * | 5/2001 | Staub et al. ................... | 701/28 |
| 6,292,725 B1 | * | 9/2001 | Kageyama et al. ......... | 180/169 |

* cited by examiner

Primary Examiner—Tan Q. Nguyen
(74) Attorney, Agent, or Firm—Perkins Coie LLP

(57) ABSTRACT

The invention discloses a method of steering a machine, in particular an agricultural machine, on a predetermined route, where, by means of an actual position detecting means, the actual position of the machine is detected and is, by means of a comparator, compared to a desired position, wherein, if there is a difference between the actual position and the desired position exceeding a certain quantity, control commands are transmitted to the machine to return same to the predetermined route on a return way, wherein, according to the invention, an optimum return way is determined in consideration of the predetermined route which still has to be traveled in the further course and corresponding control commands are transmitted to the machine, which return the machine to a desired position of the predetermined route on the optimum return way.

12 Claims, 2 Drawing Sheets

METHOD OF STEERING A MACHINE ON A PREDETERMINED ROUTE AND DEVICE FOR ITS EXECUTION

BACKGROUND OF INVENTION

The invention relates to a method of steering a machine on a predetermined route according to the preamble of claim 1 and a device for its execution.

The method is in particular suitable for steering agricultural machines. However, it can also be used in other fields, e.g. for steering building machines.

The document EP 0 821 296 A2 discloses a method which i. a. serves for the purpose of steering an agricultural machine on a predetermined route. According to this method, for position finding of the machine, a differential GPS is used. In order to allow steering of the machine even upon failure of the GPS, further, a dead reckoning navigation system is provided which uses diverse sensors such as wheel sensors, speed sensors, steering angle sensors and direction sensors.

Conventional systems work so that an actual position of the machine and/or an agricultural machine is compared to a desired position and, if there is a difference between the actual value and the desired value exceeding a certain quantity, a control command is output which has the object to return the vehicle to the desired position as quickly as possible. In order to achieve and a sufficiently exact guidance of the vehicle and ensure that, after reaching the desired position, the vehicle is moved on on the predetermined route there are high demands to control and, in particular, control time.

SUMMARY OF INVENTION

It is the object of the invention to provide a method of steering a machine on a predetermined route which ensures, at a reasonable expenditure, that the machine travels a continuous route which corresponds to the desired route with sufficient accuracy.

This problem is solved by the features of claim 1. According to the invention, a method of steering a machine on a predetermined route is provided, where, by means of an actual position detecting means, the actual position of the machine is detected and is, by means of a comparator, compared to a desired position, wherein, if there is a difference between the actual position and the desired position exceeding a certain quantity, control commands are transmitted to the machine to return same to the predetermined route on a return way. According to the invention, however, the machine is not necessarily returned on the shortest way and the return is not necessarily effected to the desired position from which a deviation was detected, but it can also be effected to another desired position, preferably in the further course of the predetermined route. According to this method, the optimum return way is determined in consideration of the predetermined route which still has to be traveled in the further course and corresponding control commands are transmitted to the machine which return the machine to a desired position on an optimum return way.

DETAILED DESCRIPTION

Figure 1:
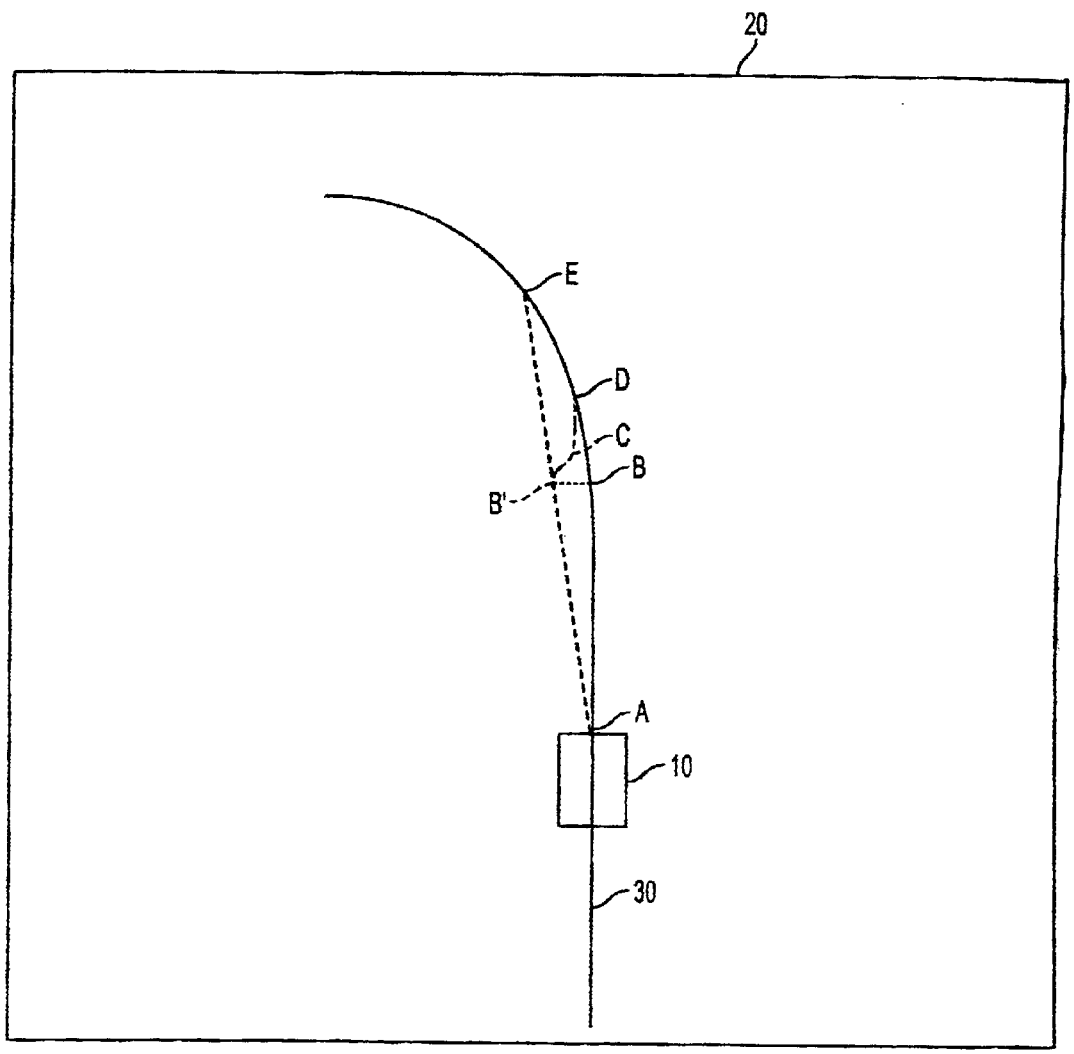
FIG. 1 shows a path of an agricultural machine.

The return way can be optimized with regard to different conditions. The optimization can be implemented to the effect that an actual route as continuous as possible is aimed at, i. e. a route without big corrections of the direction. It has turned out that the known return from the actual position to the desired position from which a deviation exceeding the tolerance was detected often requires relatively big changes of direction so as to realign the machine to the course of the predetermined route. These changes of direction may cause problems in connection with the steering of the machine. Further, this may lead to an extremely discontinuous route which renders an efficient ground treatment difficult or impossible, so that, if necessary, ground treatment is interrupted during the return. If, however, when determining the return way, the further course of the predetermined route is considered a return way can be chosen which returns the machine continuously to the predetermined route without big changes of direction. If the return way is displaced with respect to the predetermined route and meets same at a relatively acute angle there are no problems with regard to the steering of the machine and ground treatment can mostly be continued also on the return way. As the deviation from the predetermined route is known this deviation can be taken into consideration during a subsequent treatment of the adjoining area.

If, in the direction of motion, the actual position is left of the desired position and if the predetermined route extends to the left the machine can e.g. be moved on substantially straight until the predetermined route and, thus, a desired position is reached. If, in the direction of motion, the actual position is right of the desired position and if the predetermined route extends to the right the machine can be moved on substantially straight until a desired position is reached. As the return way is determined foresightedly the machine can be moved in the direction of the predetermined route with slight corrections of direction before reaching the predetermined route, so that the return way meets the predetermined route at an acute angle.

By means of the control commands, the machine's steering and/or drive can be influenced. As, due to the deviation from the predetermined route, changes in the covered distance may occur it can be useful to increase or reduce the travelling speed in order to return to the predetermined course. Due to the fact that not just a simple return from the actual position to the desired position is executed even a reduction of the distance may occur if, for example, a curve of the predetermined route is cut in order to return to the predetermined route.

Advantageously, by means of the control commands, the machine's direction of motion will be, even before reaching the desired position, adapted to the direction of the route to be traveled after reaching the desired position.

The return way can be straight or curved, can include straight sections and curved sections, any kind of curves etc. The return way can be optimized in view of different parameters. The machine's function, e.g. the function of a vehicle for bringing out seed, is of equal importance as e.g. other requirements regarding the treatment of surfaces and the machine characteristics.

For determining the actual position, a GPS can be used. For increasing accuracy, also differential GPS or other known systems can be made use of. However, also other sensors for determining the actual position as exactly as possible can be used. Radar, Doppler effect radar or dead reckoning navigation can be employed. In particular when the GPS fails or does not output an acceptable actual position it is necessary to use other systems. The actual positions output by the GPS can be permanently subjected to a plausibility check. If a value is recognized as not reliable other systems can be used. In particular dead reckoning navigation is suitable for bridging small distances on which no acceptable actual position output by the GPS exists. For executing dead reckoning navigation, the travelling direction and the travelling speed has to be detected. The travelling direction can be detected by means of a gyroscope or an electronic compass, the travelling speed can be detected by means of wheel sensors detecting the torque. When running on natural ground, however, depending on the ground, even the non-driven wheels may slip. Also the data of other sensors may include errors.

Therefore, advantageously, a permanent correction of the data supplied by the sensors by means of an actual position determination independent of the sensors is executed. For example, the data can be corrected on the basis of the actual position determination by the GPS. If, then, over a certain distance, the actual position must be determined in a manner independent of the GPS, by using this correction, the actual position can also be determined by simple dead reckoning navigation with relatively high accuracy. If the machine e.g. moves over a muddy piece of ground the wheels will have a higher slip. As long as the actual position output by the GPS is correct this higher slip is noticed and a corresponding correction is effected. If, then, the GPS fails or does not supply acceptable data, on the basis of the corrected sensor values, by way of dead reckoning navigation, the actual position can be determined with a relatively high accuracy at least as long as the parameters, e.g. the wheel slip, do not significantly change. Since, however, mostly, relatively short distances have to be bridged this method has proven worthwhile and is able to determine a sufficiently exact actual position even if the ground quality is unfavorable, there is unfavorable vegetation etc.

Further, a device for executing the method is provided, which includes a unit determining a return way, which determines the optimum return way in consideration of the machine's route still to be traveled, wherein, additionally, numerous other parameters such as the kind of ground treatment, travelling and working characteristics of the agricultural machine or also the ground quality can be taken into account when determining the optimum return way.

The device can comprise a reception unit which is capable of receiving control commands and, on the basis of these control commands, outputs control signals to the machine's steering and/or drive. However, also control commands to other parts of the machine, e.g. for ground treatment, can be output.

The device part which is e.g. installed at the agricultural machine is usefully provided with sensors for detecting the actual position of the machine. This may comprise a GPS but also other known sensors already mentioned.

Advantageously, the device is provided with a correcting unit by means of which, during operation of the machine, continually, the data of the sensors are corrected based on an actual position detection independent of these sensors so as to improve the accuracy of the position determination.

In the following, the method of steering a machine on a predetermined route is illustrated by a figure.

FIG. 1 depicts an agricultural vehicle 10 situated on an agricultural field 20. The agricultural machine 10 is traveling along a predetermined route 30.

The continuous line of the figure shows the predetermined route. The dashed line represents the machine's actual route. It is apparent that, proceeding from point A, the deviation of the actual route from the predetermined route permanently increases. When reaching point B', the deviation of the actual position B' from the desired position, that is point B, is so large that the tolerance limit is exceeded and the machine is returned to the predetermined route on a return way by the described method.

Conventional control devices return the machine from the actual position B' to the desired position B on the shortest possible way when a tolerance is exceeded, as illustrated by the dotted line.

According to the invention, however, the determination of the return way is effected in consideration of the route to be further traveled. In this way, it is recognized that the further route bends to the left and the machine can be returned to the predetermined route simply by going on straight without big and problematic changes of direction and reaches the predetermined route at point E.

The determined return way shall be the optimum return way in consideration of the further route and the further conditions. If, for example, a ground treatment on the dashed return way is not possible or not useful since same is too far from the predetermined route a return way according to the dash-dot line can be chosen, which meets the predetermined route at point D and allows a useful ground treatment starting at point C and which, nevertheless, does not require big changes of direction and meets the predetermined route at an acute angle, thereby a change in the vehicle steering from the return way to the predetermined route being made possible without problems.

Figure 2:
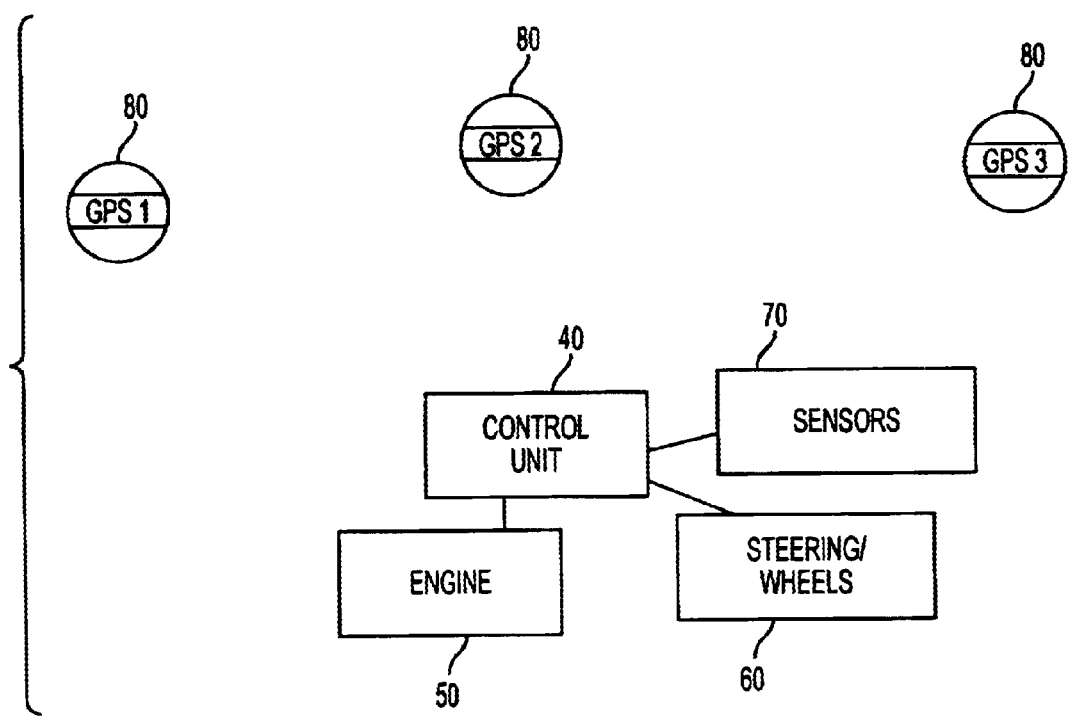
FIG. 2 shows a block diagram of the agricultural machine.

FIG. 2 shows a block diagram of the agricultural machine 10. The agricultural machine 10 includes a control unit 40, an engine 50, a steering mechanism and wheels 60 and sensors 70. The control unit 40 operates the agricultural machine 10 by controlling the engine 50 and the steering/wheels 60. Sensors 70 help determine what direction the agricultural machine is moving and its actual position. Additionally, a GPS satellite system 80 can be used to help determine the location of the agricultural machine.

What is claimed is:

1. A method for steering an agricultural machine on a predetermined off-road route comprising:

determining an actual position of an agricultural machine;

pre-determining a maximum angle at which the agricultural machine may be turned, wherein any change in direction that exceeds the pre-determined maximum angle is a big change in direction;

comparing the actual position relative to a desired position of the agricultural machine wherein the desired position is located on a predetermined off-road route;

transmitting steering controls to the agricultural machine if a difference between the actual position and the desired position exceeds a certain quantity wherein the control commands cause the agricultural machine to be steered to a new future position on the predetermined route via an unconstrained path, different from the predetermined route, based upon a future segment of the predetermined off-road route;

wherein the machine's return to the new future position is effected on a return way which minimizes a divergence from the predetermined off-road route as well as avoiding big changes of direction in an actual path of travel; and wherein by means of control commands, the machine's direction of motion is, already before the new future position, adapted to the direction of the predetermined off-road route to be traveled after reaching the new fixture position.

2. A method according to claim 1, wherein by means of the control commands, the steering of the machine is actuated.

3. A method according to claim 1, wherein the machine's return to the new future position is effected on a straight return way or a curve return way.

4. A method according to claim 3, wherein if the actual position is located left of the desired position in the direction and the predetermined off-road route extends to the left, the machine is moved on substantially straight until the new future position is reached.

5. A method according to claim 4, wherein if the actual position is located right of the desired position in the direction of motion and the predetermined off-road route extends to the right, the machine is moved on substantially straight until the new future position is reached.

6. A method according to claim 1, characterized in that, for detecting the actual position (B'), a GPS is used.

7. A method according to claim 1, wherein detecting the actual position a set of wheel sensors are used for detecting torque and a set of direction detectors are used for detecting a direction of motion.

8. A method according to claim 6, wherein it on the basis of GPS, an incorrect position is obtained, the actual position is determined by means of other sensors.

9. A method according to claim 8, wherein during operation, permanently, a continuous correction of a set of data supplied by the wheel and the direction sensors is effected by using an actual position determination independent of the wheel and the direction sensors.

10. A method according to claim 1, wherein the maximum angle is determined by a type of ground treatment performed by the agricultural machine.

11. A method according to claim 1, wherein the maximum angle is determined by steering constraints of the agricultural machine.

12. A method according to claim 1, wherein the maximum angle is determined by timing and control constraints of the agricultural machine.

* * * * *